United States Patent
Park et al.

(10) Patent No.: US 11,500,471 B2
(45) Date of Patent: Nov. 15, 2022

(54) PERSONAL MOBILITY AND CONTROL METHOD THEREOF

(71) Applicants: Hyundai Motor Company, Seoul (KR); Kia Motors Corporation, Seoul (KR)

(72) Inventors: Minjae Park, Seongnam-si (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 33 days.

(21) Appl. No.: 17/119,449

(22) Filed: Dec. 11, 2020

(65) Prior Publication Data
US 2022/0137710 A1    May 5, 2022

(30) Foreign Application Priority Data

Nov. 2, 2020    (KR) .................... 10-2020-0144050

(51) Int. Cl.

| | | |
|---|---|---|
| *G06F 3/048* | (2013.01) | |
| *G06F 3/01* | (2006.01) | |
| *G06F 1/16* | (2006.01) | |
| *B62J 45/40* | (2020.01) | |
| *H04W 4/021* | (2018.01) | |

(Continued)

(52) U.S. Cl.
CPC ............. *G06F 3/017* (2013.01); *B62J 45/40* (2020.02); *B62J 50/22* (2020.02); *G06F 1/163* (2013.01); *G06V 40/107* (2022.01); *G06V 40/28* (2022.01); *H04W 4/021* (2013.01); *H04W 4/027* (2013.01)

(58) Field of Classification Search
CPC ...... G06F 3/017; G06F 3/04883; G06F 3/011; G06F 3/016; G06F 3/04842; G06F 2203/04108; G06F 3/0304; G06F 3/0421; G06F 3/0488; G06F 1/163; G06F 1/3231; G06F 1/3237; G06F 1/3265; G06F 3/013; G06F 3/0346; G06F 3/041; G06F 3/0416; G06F 3/042; G06F 3/04817; G06F 3/0482; G06F 3/0486; G06F 21/83; G06F 2203/0381; G06F 3/0233; G06F 3/03547; G06F 3/038; G06F 3/0425; G06F 3/04815; G06F 3/0484; G06F 3/04845; G06F 3/0485; G06F 3/16; G06F 3/167; G08G 1/0962; G08G 1/095; G08G 1/096;
(Continued)

(56) References Cited

U.S. PATENT DOCUMENTS 3,889,190 A * 6/1975 Palmer .................... A42B 3/30
                                                     455/100
2013/0346168 A1* 12/2013 Zhou ..................... G06Q 20/321
                                                     701/428

(Continued)

*Primary Examiner* — Rayeez R Chowdhury
(74) *Attorney, Agent, or Firm* — Slater Matsil, LLP

(57) ABSTRACT

A personal mobility includes a recognizer configured to recognize a surrounding situation, a transceiver configured to communicate with a wearable electronic device, and a controller configured to recognize the surrounding situation when receiving a user's gesture information through the transceiver, generate first hand signal information based on the recognized surrounding situation, recognize a changed surrounding situation in response to the first hand signal information, and generate second hand signal information based on the changed surrounding situation.

24 Claims, 9 Drawing Sheets

(51) Int. Cl.
*H04W 4/02* (2018.01)
*B62J 50/22* (2020.01)
*G06V 40/20* (2022.01)
*G06V 40/10* (2022.01)

(58) Field of Classification Search
CPC ....... G08G 1/096716; G08G 1/096758; G08G 1/096775; G01N 21/314; G01N 21/3554
See application file for complete search history.

(56) References Cited

U.S. PATENT DOCUMENTS

| | | | |
|---|---|---|---|
| 2014/0107868 A1* | 4/2014 | DiGiacomcantonio | A45C 5/14 701/2 |
| 2016/0091188 A1* | 3/2016 | Milligan | H05B 47/00 362/105 |
| 2017/0048680 A1* | 2/2017 | Chuang | H04W 4/80 |
| 2019/0369643 A1* | 12/2019 | Jeon | G08G 1/091 |
| 2020/0352264 A1* | 11/2020 | Fugate | A41D 19/0024 |
| 2021/0253193 A1* | 8/2021 | Liu | B62K 21/00 |

* cited by examiner

FIG. 5

| HAND SIGNAL SIZE | HAND SIGNAL HAND POSITION | HAND SIGNAL TRANSFER DIRECTION | HAND SIGNAL TRANSFER RANGE |
|---|---|---|---|
| LARGE HAND SIGNAL (FULL ARM MOVEMENT) | RIGHT HAND or LEFT HAND | c ZONE or a,d ZONE or b ZONE | PM / VEHICLE BEHIND OR ON SIDE OF OWN PM (WITHIN 7M) |
| | | | PERSON IN FRONT |
| SMALL HAND SIGNAL (WRIST MOVEMENT) | | | PM RIGHT AFTER OWN PM |
| | | | PERSON RIGHT IN FRONT |

PERSONAL MOBILITY AND CONTROL METHOD THEREOF

CROSS-REFERENCE TO RELATED APPLICATIONS

This application claims the benefit of Korean Patent Application No. 10-2020-0144050, filed on Nov. 2, 2020, which application is hereby incorporated herein by reference.

TECHNICAL FIELD

The present disclosure relates to a personal mobility and a control method thereof.

BACKGROUND

Recently, a development of a single-person vehicle called a personal mobility has increased due to environmental regulations and an increase in metropolitan cities. The personal mobility is a medium/short range mobile device that combines electric charging and power technologies, and is also called a smart mobility and a micro mobility.

In other words, a personal mobility does not emit environmental pollutants because its power source is electricity.

In addition, a personal mobility is in the spotlight as a mobile device that is easy to carry and can solve traffic jams and parking problems.

As the personal mobility market expands, more and more people drive in clusters on the road.

However, a personal mobility does not have separate signaling means such as the brake lights and turn signals of automobiles, so accidents are likely to occur.

SUMMARY

A personal mobility according to an embodiment of the present disclosure provides a hand signal by recognizing a surrounding situation, thereby effectively controlling the personal mobility.

In accordance with an embodiment of the present disclosure, a personal mobility includes a recognizer configured to recognize a surrounding situation, a transceiver configured to communicate with a wearable electronic device, and a controller configured to recognize the surrounding situation when receiving a user gesture information through the transceiver, generate first hand signal information based on the recognized surrounding situation, recognize the changed surrounding situation in response to the first hand signal information, and generate second hand signal information based on the changed surrounding situation.

The personal mobility may further include a display configured to display at least one of the first hand signal information and the second hand signal information.

The controller may be configured to control the recognizer to recognize the surrounding situation when the received user gesture information is predetermined gesture information.

The second hand signal information may include feedback information.

The feedback information may include whether the user performs the first hand signal corresponding to the first hand signal information.

The recognizer may include at least one camera, and the recognizer may communicate with at least one of a number of personal mobilities through an intelligent transportation system (ITS).

The first hand signal information may be generated based on at least one of a number of personal mobilities located within a predetermined range, a detailed position of the personal mobilities located within the predetermined range, a number of pedestrians located within the predetermined range, and a detailed position of the pedestrians located within the predetermined range.

The first hand signal information may be generated to comprise at least one of size information of a hand signal, left or right position information of a hand signal, transfer direction information of a hand signal, and transfer range information of a hand signal.

The controller may be configured to determine whether the surrounding situation changes based on at least one of a speed change value of a personal mobility located within a predetermined range and a GPS change value of a personal mobility within a predetermined range.

The personal mobility may further include a sound outputter configured to output at least one of the first hand signal information, the second hand signal information, or the feedback information.

In accordance with another embodiment of the present disclosure, a control method of a personal mobility includes recognizing a surrounding situation when receiving user gesture information, generating first hand signal information based on the recognized surrounding situation, recognizing the changed surrounding situation in response to the first hand signal information, and generating second hand signal information based on the changed surrounding situation.

The control method may further include displaying at least one of the first hand signal information or the second hand signal information.

The control method may further include recognizing the surrounding situation when the received user gesture information matches predetermined gesture information by comparing the received user gesture information and the predetermined gesture information.

The second hand signal information may further include feedback information.

The feedback information may include whether the user performs the first hand signal corresponding to the first hand signal information.

The recognizing the surrounding situation may include using at least one of a camera, and communicating with at least one of a number of personal mobilities through an intelligent transportation system (ITS).

The first hand signal information may be generated based on at least one of a number of personal mobilities located within a predetermined range, a detailed position of the personal mobilities located within the predetermined range, a number of pedestrians located within the predetermined range, and a detailed position of the pedestrians located within the predetermined range.

The first hand signal information may be generated to comprise at least one of size information of a hand signal, left or right position information of a hand signal, transfer direction information of a hand signal, and transfer range information of a hand signal.

The control method may further include determining whether the surrounding situation changes based on at least one of a speed change value of a personal mobility located within a predetermined range and a GPS change value of a personal mobility within a predetermined range.

The control method may further include outputting at least one of the first hand signal information, the second hand signal information, and the feedback information.

In accordance with another embodiment of the present disclosure, a wearable electronic device includes a user interface, a sensor configured to detect a user's gesture, a communication module configured to communicate with a plurality of personal mobilities; and a processor configured to transmit information corresponding to the user's gesture to a first personal mobility when the user's gesture is detected, receive first hand signal information from the first personal mobility, recognize a changed surrounding situation information in response to the received first hand signal information and transmit the changed surrounding situation information to the first personal mobility.

The processor may be configured to receive second hand signal information comprising feedback information from the first personal mobility.

The processor may be configured to control to display at least one of the received first hand signal information or the second hand signal information on the user interface.

The processor may be configured to detect a position value of the plurality of personal mobilities and transmit the position value to the first personal mobility.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 5 is a configuration diagram of generated hand signal information of a personal mobility according to an embodiment of the present disclosure;

DETAILED DESCRIPTION OF ILLUSTRATIVE EMBODIMENTS

Figure 1:
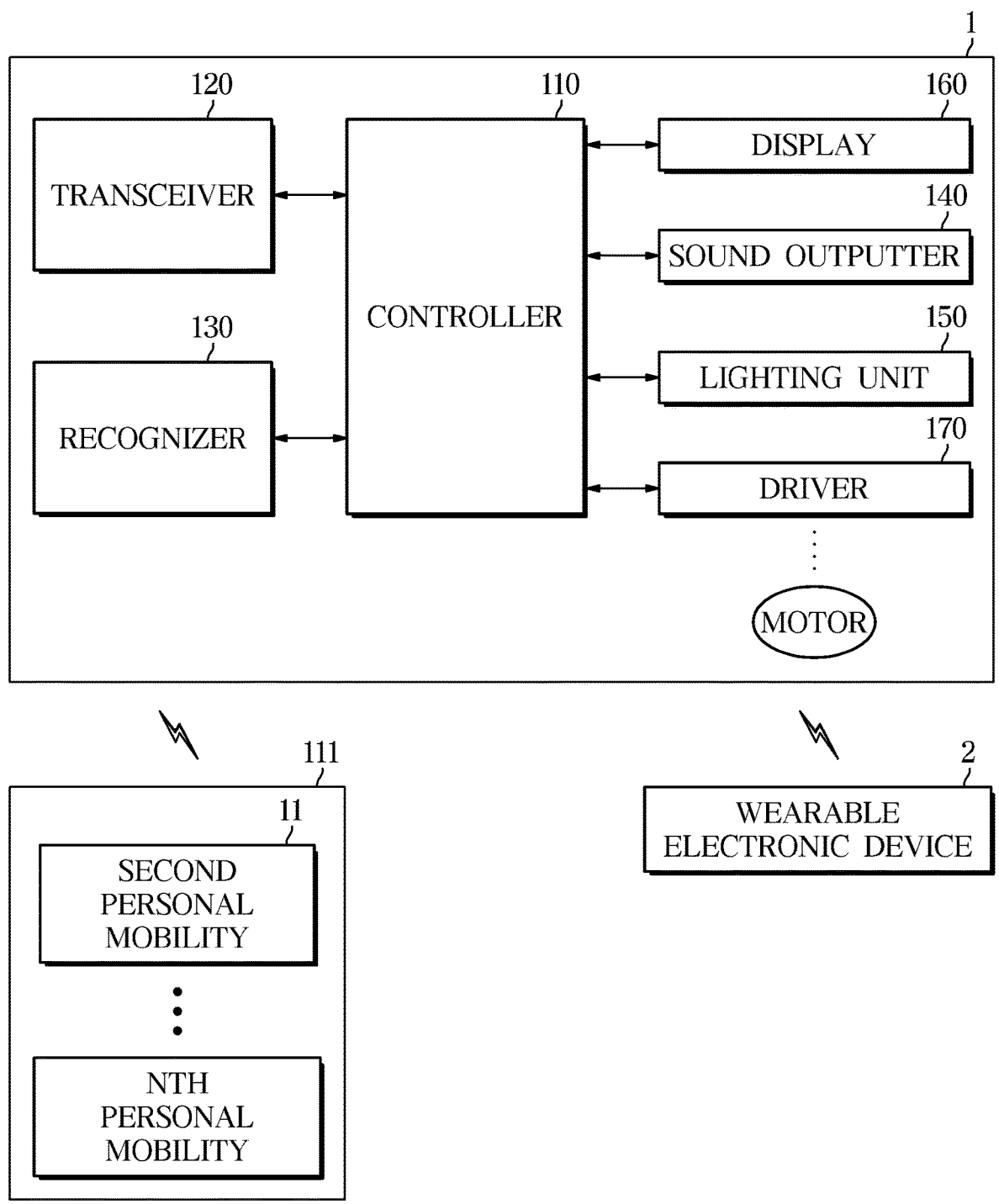
FIG. 1 is a control configuration diagram of a personal mobility communicating with a wearable electronic device according to an embodiment of the present disclosure.

Like reference numerals refer to like elements throughout. The present disclosure does not describe all elements of the embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'parts, modules, members, blocks' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

FIG. 1 is a control configuration diagram of a personal mobility communicating with a wearable electronic device according to an embodiment of the present disclosure.

The personal mobility 1 may include a transceiver 120 communicating with a wearable electronic device 2, a recognizer 130 that recognizes a surrounding situation and a controller 110 recognizing the surrounding situation when receiving user gesture information from the wearable electronic device 2 through the transceiver 120, determining whether to generate first hand signal information based on the recognized surrounding situation, generating the first hand signal information according to the determination result and generating second hand signal information based on the surrounding situation changed in response to the first hand signal information.

In addition, the personal mobility 1 may further include a display 160 that displays at least one of the first hand signal information and the second hand signal information.

The display 160 may perform at least one of a navigation function, an audio function, a video function, a radio function, a web search function, a broadcasting function (i.e., a DMB function), and an Internet function.

The display 160 may include a first input device (not shown) to receive a command for performing the operation of the personal mobility 1 from the user.

The first input device (not shown) may include a hardware device such as buttons, switches, pedals, keyboards, mice, track-balls, various levers, handles or sticks for user input.

Also, the first input device (not shown) may include a graphical user interface (GUI), such as a touch pad for user input, that is, a software device.

The first input device (not shown) may receive a power on/off command for the personal mobility 1, a pairing command with the wearable electronic device 2, a start command, a stop command, a braking command, a steering command, a deceleration command, an acceleration command, an end command, speed information, etc.

The display 160 may include a flat panel display that displays at least one of the first hand signal information or the second hand signal information as an image.

The display 160 may display operation on/off information of the personal mobility 1.

When performing a navigation function, the display 160 may display at least one of map information, route information, current location information, driving speed information, destination information, and traffic information as an image.

The display 160 may display communication connection information with the wearable electronic device 2, communication connection information of a plurality of personal mobilities in, and may display a plurality of personal mobilities 111 operation information.

The display 160 may also display information on the amount of charge of the battery of the personal mobility 1.

The display 160 may display a driving time, a time remaining to a destination, a current time, and the like.

The controller 110 may control power supplied to the motor by comparing the driving speed of the personal mobility 1 and a target speed.

The controller 110 obtains charge amount information of a battery based on information detected by a charge amount detector (not shown) and controls display of the obtained charge amount information of the battery.

When the navigation function is selected and destination information is input, the controller 110 generates route information based on current location information and destination information, matches the generated route information to the map information, and controls the output of the matched map information and route information.

When generating route information, the controller 110 may generate optimal route information using traffic information.

The controller 110 may control an operation of at least one of the display 160, the sound outputter 140, the lighting unit 150, and the driver 170 based on the user input.

The controller 110 is a memory (not shown) that stores data for an algorithm or a program that reproduces the algorithm for controlling the operation of components in the personal mobility 1, and a processor (not shown) that performs the above-described operation using the data stored in the memory. At this time, the memory and the processor may be implemented as separate chips, respectively. Alternatively, the memory and the processor may be implemented as a single chip.

The storage (not shown) stores identification information of the first personal mobility 1 and pairing information of the first personal mobility 1.

The storage (not shown) may also store identification information of a plurality of personal mobilities 111. The plurality of personal mobilities in are personal mobilities that perform group riding with the first personal mobility 1 and may be a follower.

The storage (not shown) may store hand signal information corresponding to gesture information. Here, the gesture information may be motion information of the wearable electronic device 2. The gesture information may be motion information of the body of the user wearing the wearable electronic device 2.

The storage (not shown) may be implemented by a nonvolatile memory device such as cache, read only memory (ROM), programmable ROM (PROM), erasable programmable ROM (EPROM), electrically erasable programmable ROM (EPMROM), and flash memory or a volatile memory device such as RAM or a storage medium such as HDD (Hard Disk Drive), or CD-ROM, but is not limited thereto. The storage (not shown) may be a memory implemented in a separate chip from the processor described above with respect to the controller, or may be implemented in a single chip with the processor.

The transceiver 120 transmits a control signal received from the wearable electronic device 2 to at least one of a plurality of mobilities in including a first personal mobility 1 and a second personal mobility 11.

The transceiver 120 may receive a signal for information transmitted from the first personal mobility 1 and transmit the received signal to the wearable electronic device 2.

The transceiver 120 may include one or more components that enable communication with the first personal mobility 1, the second personal mobility 11, the plurality of personal mobilities including the second personal mobility 11, and the external device, for example, at least one of a short-range communication module, a wired communication module, and a wireless communication module.

The short-range communication module may include various short-range communication modules that transmit and receive signals using a wireless communication network at a short distance such as a Bluetooth module, an infrared communication module, an RFID (Radio Frequency Identification) communication module, a WLAN (Wireless Local Access Network) communication module, an NFC communication module, and a Zigbee communication module.

The wired communication module may include various cable communication modules such as a Controller Area Network (CAN) communication module, a Local Area Network (LAN) module, a Wide Area Network (WAN) module or a Value Added Network (VAN) module, etc., as well as various wired communication modules such as a Universal Serial Bus (USB), a High Definition Multimedia Interface (HDMI), a Digital Visual Interface (DVI), a recommended standard 232 (RS-232), a power line communication, or a plain old telephone service (POTS), etc.

The wireless communication module may include a wireless communication module supporting various wireless communication methods such as a Wi-Fi 33 module and a Wireless broadband module, a global system for mobile communication (GSM), a Code Division Multiple Access (CDMA), a Wideband Code Division Multiple Access (WCDMA), a universal mobile telecommunications system (UMTS), a TDMA (Time Division Multiple Access (LTE), a Long Term Evolution (LTE), etc.

The wireless communication module may include a wireless communication interface including an antenna and a transmitter for transmitting signals to a personal mobility. In addition, the wireless communication module may further include a signal conversion module that modulates a digital control signal output from the controller into an analog type wireless signal through a wireless communication interface under control of the controller.

The wireless communication module may include a wireless communication interface including an antenna and a receiver to receive signals of a personal mobility. Also, the wireless communication module may further include a signal conversion module for demodulating the analog type wireless signal received through the wireless communication interface into a digital control signal.

In addition, the second personal mobility 11 may be a personal mobility located within a predetermined range with the first personal mobility 1 and may be a personal mobility performing group riding with the first personal mobility 1.

The second personal mobility 11 may be a personal mobility positioned in front of the first personal mobility 1, and may be a personal mobility positioned behind the first personal mobility 1.

Here, the predetermined range includes an area within a distance in which a user's gesture of the first personal mobility can be visually recognized among all the front, rear, left, and right directions based on the first personal mobility 1.

A personal mobility can be classified into a first personal mobility 1 driven by a leader and a second personal mobility 11 driven by a follower. The control configuration of the first personal mobility 1 and a control configuration of the second personal mobility 11 may be the same.

In the first personal mobility 1, state information of the personal mobility may be a leader state, and in the second personal mobility 11, state information of the personal mobility may be a follower state.

The display 160 may display on/off information of a group riding mode and state information of the personal mobility 1.

In the predetermined range, a direction and a distance may be set according to a user's selection.

The predetermined range may be variably set according to environmental information such as weather, season, and time.

Hereinafter, a control configuration of the controller 110 according to the recognition of the surrounding situation of the personal mobility 1 will be described.

The controller 110 may receive gesture information from the wearable electronic device 2.

The controller 110 may determine whether the received gesture information matches predetermined gesture information.

If the received gesture information matches predetermined gesture information, the controller 110 may control the recognizer 130 so that the personal mobility 1 recognizes a surrounding situation.

In more detail, recognizing the surrounding situation may be to recognize at least one of the number of personal mobilities located within a predetermined range of the personal mobility 1, the detailed position of the personal mobilities located within the predetermined range, the number of pedestrians located within the predetermined range, and the detailed positions of the pedestrians located within a predetermined range.

In the predetermined range, a direction and a distance may be set according to a user's selection of the personal mobility 1.

The controller 110 may recognize the surrounding situation based on image information obtained through a camera. In addition, the controller 110 may recognize the surrounding situation based on location information of the personal mobilities located within a predetermined range and location information of pedestrians located within a predetermined range obtained through an Intelligent Transportation System (ITS).

The controller 110 may receive a personal mobility position value and a pedestrian position value located within the predetermined range through the ITS.

The controller 110 determines whether there is an object to which at least one hand signal of a personal mobility, a pedestrian, and a vehicle is to be transmitted based on the surrounding situation, and when it is determined that the object to which at least one hand signal is to be transmitted is a personal mobility, the controller 110 may determine the location of the personal mobility within the predetermined range. When an object to which at least one hand signal is to be transmitted is a pedestrian, the position of the pedestrian within the predetermined range may be determined.

When it is determined that an object to which at least one hand signal is to be transmitted is a personal mobility, the controller 110 may determine the number of personal mobilities within the predetermined range. When an object to which at least one hand signal is to be transmitted is a pedestrian, the controller 110 may determine the number of pedestrians within the predetermined range.

The controller 110 may generate first hand signal information based on the number and location of personal mobilities within the predetermined range or the number and location of pedestrians within the predetermined range.

The controller 110 may generate the first hand signal information by including at least one of size information of a hand signal, left or right position information of a hand signal, transfer direction information of a hand signal, and transfer range information of a hand signal.

The controller 110 may control to display the generated first hand signal information on the display 160.

The controller 110 may control the sound outputter 140 to output the generated first hand signal information.

According to the first hand signal information provided through the display 160 and the sound outputter 140, a user who has boarded the personal mobility 1 may perform a first hand signal corresponding to the first hand signal information.

The controller 110 may recognize a change in a surrounding situation within a predetermined range. The controller 110 may check a speed value of whether a speed of a personal mobility located within the predetermined range and a speed of a pedestrian located within the predetermined range have changed. In addition, it is possible to check the GPS value of whether the GPS of the personal mobility located within the predetermined range and the speed of the pedestrian within the predetermined range have changed.

The controller 110 may check whether the surrounding environment has changed to correspond to the first hand signal information based on the checked speed value and the checked GPS.

When the surrounding environment has not changed to correspond to the first hand signal information, the controller 110 may generate second hand signal information for the user to perform a first hand signal corresponding to the first hand signal information again.

The second hand signal may include the first hand signal information, and the second hand signal information may include feedback information for proposing to perform the first hand signal again.

The controller 110 may control to display the generated second hand signal information on the display 160.

The controller 110 may control the sound outputter 140 to output the generated second hand signal information.

According to the second hand signal information provided through the display 160 and the sound outputter 140, a user who has boarded the personal mobility 1 may perform a first hand signal corresponding to the second hand signal information.

Figure 2:
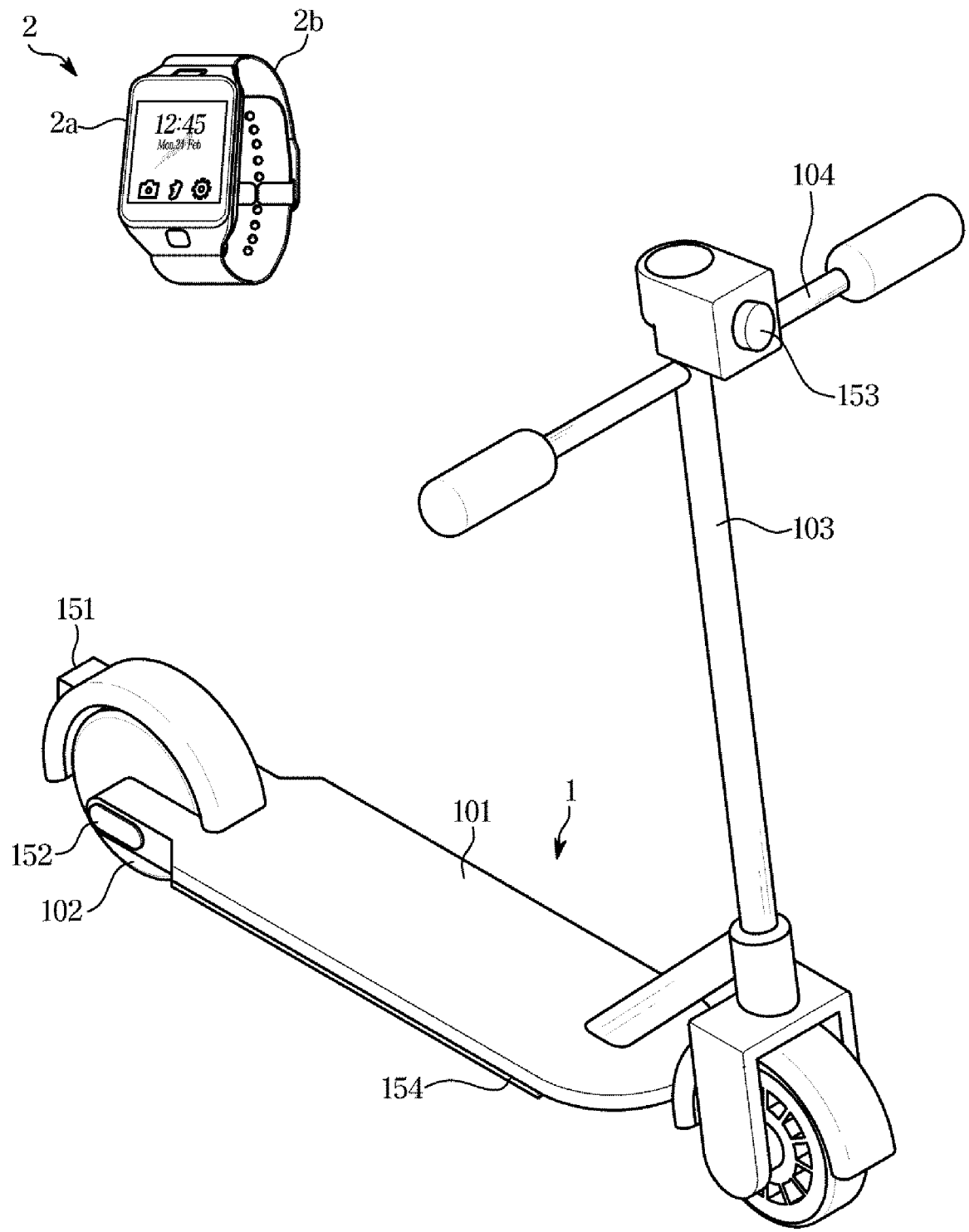
FIG. 2 is an exemplary diagram of a wearable electronic device and a personal mobility communicating with the wearable electronic device according to an embodiment.

FIG. 2 is an exemplary diagram of a wearable electronic device and a personal mobility communicating with the wearable electronic device according to an embodiment.

As shown in FIG. 2, the watch-type wearable electronic device 2 includes a body 2a having a first user interface, and a band 2b connected to the body 2a to be worn on a wrist.

The band 2b is worn on the wrist to surround the wrist, and may be formed of a flexible material to facilitate wearing. As such an example, the band 2b may be formed of leather, rubber, silicone, synthetic resin material, or the like. In addition, the band 2b is configured to be detachably attached to the main body 2a, and may be configured to be replaceable with various types of bands according to the user's taste.

A fastener may be provided on the band 2b. The fastener may be implemented by a buckle, a hook structure capable of snap-fit, or Velcro, and may include an elastic section or material.

As shown in FIG. 2, a personal mobility 1 includes a board 101 on which the user can stand, a wheel 102 provided at the lower side of the board 101, or a plurality of wheels 102 provided at the front and rear of the board 101, a support 103 connected to the wheel 102 and the board 101 and transmitting a force corresponding to the steering intent to the wheel, and a handle 104 connected to the support 103 and to which a force corresponding to the steering intent is applied, and the user can grip, and further includes a brake pedal (or brake button) that is pressed by the user according to the user's braking intent, and an accelerator pedal (or accelerator button) pressed by the user according to the user's intent to accelerate.

The personal mobility 1 may include driving devices such as a power generating device, a braking device, and a steering device for applying a driving force and a braking force to one or a plurality of wheels 102. In addition, the power generating device may include a battery and a motor.

Figure 3:
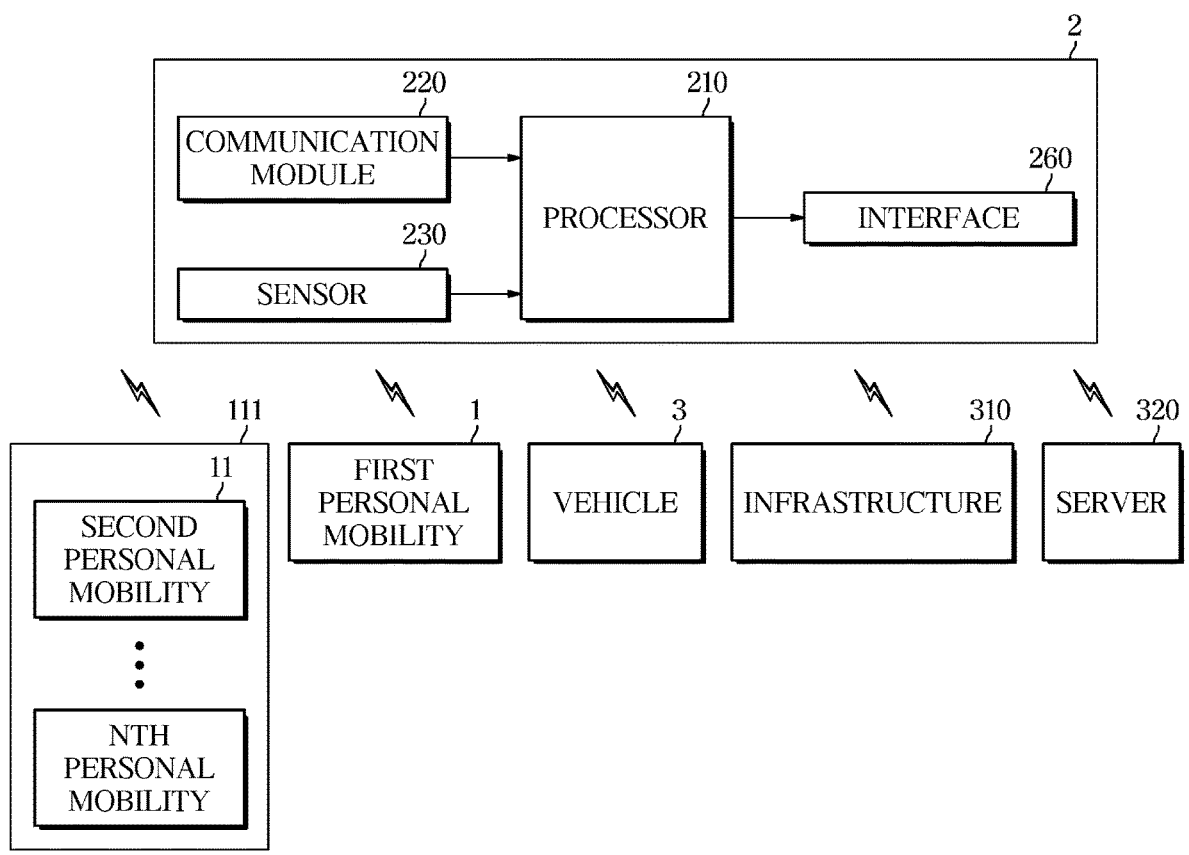
FIG. 3 is a control configuration diagram of a wearable electronic device according to an embodiment of the present disclosure.

FIG. 3 is a control configuration diagram of a wearable electronic device according to an embodiment of the present disclosure.

The wearable electronic device 2 is a user terminal, and the terminal device can be embodied as a computer or a portable terminal capable of accessing the personal mobility 1 through a network. Here, the terminal device 2 includes, for example, a laptop equipped with a web browser, a desktop, a laptop, a tablet PC, a slate PC, and the like, and the portable terminal may include all kinds of handheld based wireless communication devices guaranteed portability and mobility such as PCS (Personal Communication System), GSM (Global System for Mobile communications), PDC (Personal Digital Cellular), PHS (Personal Handyphone System), PDA (Personal Digital Assistant), International Mobile Telecommunication (IMT)-2000, Code Division Multiple Access (CDMA)-2000, W-Code Division Multiple Access (W-CDMA), a WiBro (Wireless Broadband Internet) terminal, such as a smart phone, or wearable devices such as head-mounted-devices (HMDs), watches, rings, bracelets, anklets, necklaces, glasses, and contact lenses.

As described above, wearable electronic devices 2 are various devices that a user can wear on a body or clothing. The wearable device may be, for example, a smart watch, smart band, wearable computer, Google Glass, Bluetooth headset, smart wear, or the like.

The terminal device 2, which is the wearable electronic device 2, may communicate with the personal mobility 1 while being worn on the user's body.

The wearable electronic device 2 can detect a user's motion and a motion state for a change in motion, and transmit information about the detected motion state to the personal mobility 1.

The wearable electronic device 2 may include a user interface 260, a sensor 230 that detects a gesture of a user who has boarded the first personal mobility 1, a communication module 220 that communicates with a plurality of personal mobilities in located within a predetermined range and a processor 210 receiving position values of the plurality of personal mobilities in from the plurality of personal mobilities 111 when the gesture of the user is detected through the sensor 230, transmitting the position value to the first personal mobility 1, receiving at least one of first hand signal information or second hand signal information from the first personal mobility 1 and controlling to display at least one of the received first hand signal information or the received second hand signal information on the user interface 260.

The user interface 260 receives user input, displays information about an operation being performed in the wearable electronic device 2, and displays information corresponding to the user input.

The user interface 260 may include a second input device (not shown).

The second input device (not shown) may include a hardware device such as buttons, switches, pedals, keyboards, mice, track-balls, various levers, handles or sticks for user input.

Also, the second input device (not shown) may include a graphical user interface (GUI), such as a touch pad for user input, that is, a software device. The touch pad may be implemented as a touch screen panel (TSP).

The second input device (not shown) may receive operation commands and destination information of a navigation function.

The second input device (not shown) is also capable of receiving a transmission command of a user input to the first personal mobility 1, and it is also possible to receive a pairing command of the first personal mobility 1 and a communication command with the first personal mobility 1.

The user interface 260 includes a cathode ray tube (CRT), a digital light processing (DLP) panel, a plasma display penal, a liquid crystal display (LCD) panel, and electricity. Electroluminescence (EL) panels, electrophoretic display (EPD) panels, electrochromic display (ECD) panels, light emitting diode (LED) panels, or organic light emitting diode (OLED) panels, but is not limited thereto.

The user interface 260 can also display interlocking information with the first personal mobility 1.

The user interface 260 displays navigation information when performing the navigation function.

The user interface 260 can display the remaining distance to the destination, the remaining time to the destination, and the arrival time at the destination, and it is also possible to display the user's schedule information.

The user interface 260 can also display information on the battery charge of the wearable electronic device 2 and communication connection information with the first personal mobility 1.

The user interface 260 can also display the battery charge amount information of the first personal mobility 1 and the movable distance information and the movable time information that can be moved to the first personal mobility 1.

The sensor 230 detects the movement of wearable electronic device 2 and outputs a signal for the detected movement. Here, the movement of the wearable electronic device 2 may be a movement of the body of a user wearing the wearable electronic device 2.

The sensor 230 includes at least one of an acceleration sensor, a gyro sensor, a collision sensor, a geomagnetic sensor, or a position sensor.

The sensor 230 may be a proximity sensor, and may also include at least one of an optical sensor, an ultrasonic sensor, or a capacitive sensor.

The wearable electronic device 2 may also include a camera (not shown) for obtaining an image of a user of the first personal mobility 1. In this case, the wearable electronic device 2 may recognize a gesture of a user based on image information by the camera and output gesture information for the recognized gesture.

The processor 210 may recognize a gesture corresponding to the movement of the wearable electronic device 2 based on the signal output from the sensor 230 and output gesture information for the recognized gesture.

Here, the gesture corresponding to the movement of the wearable electronic device 2 is a gesture for the movement of the body of the user wearing the wearable electronic device 2, and may be a hand signal taken by the intention of the user.

The gesture information is information about a change in the position of the body movement, and may include direction information and distance information about the body movement.

The processor 210 may transmit gesture information on the recognized gesture to the first personal mobility 1.

The processor 210 may receive at least one of first hand signal information or second hand signal information from the first personal mobility 1.

The processor 210 may directly transmit at least one of the first hand signal information or the second hand signal information to the second personal mobility 11.

The processor 210 may directly transmit at least one of the first hand signal information or the second hand signal information to a plurality of personal mobilities 111 including the second personal mobility 11.

Here, the plurality of personal mobilities in may mean personal mobilities located within a predetermined range.

In the predetermined range, a direction and a distance may be set according to a user's selection.

The predetermined range may be variably set according to environmental information such as weather, season, and time.

When the detection signal of the sensor 230 is received while the hand signal mode of the wearable electronic device 2 is deactivated, the processor 210 activates the hand signal mode, initiates communication with the first personal mobility 1, and when a detection signal from the sensor 230 is received during communication with the first personal mobility 1, may recognize a gesture based on the received detection signal.

The processor 210 may recognize a gesture based on the received detection signal, and when the recognized gesture is determined to be a predetermined gesture, may transmit gesture information on the recognized gesture to the first personal mobility 1.

The processor 210 recognizes a gesture based on the received detection signal, and activates the hand signal mode and initiates communication with the first personal mobility 1 when it is determined that the information on the recognized gesture is information on the starting gesture, and recognizes a gesture based on the received detection signal when a detection signal of the sensor 230 is received during communication with the first personal mobility 1.

The second personal mobility 11 may be a personal mobility located within a preset range of the first personal mobility 1, and may be the personal mobility performing group riding with the first personal mobility 1.

The second personal mobility 11 may be a personal mobility located in front of the first personal mobility 1, and may be a personal mobility located behind the first personal mobility 1.

Here, the preset range includes an area within a distance capable of visually recognizing a user's gesture of the first personal mobility in all directions in front, rear, left, and right based on the first personal mobility 1.

A sound outputter (not shown) that outputs operation information of the wearable electronic device 2 as sound is further included.

The sound outputter may output navigation information as sound when performing the navigation function. The sound output may also output charging request information of the first personal mobility 1 as sound.

The processor 210 is a memory (not shown) that stores data for an algorithm or a program that reproduces the algorithm for controlling the operation of components in the wearable electronic device 2, and a processor that performs the above-described operation using the data stored in the memory (not shown). At this time, the memory and the processor may be implemented as separate chips, respectively. Alternatively, the memory and processor may be implemented as a single chip.

A storage (not shown) stores identification information of the first personal mobility 1 and pairing information of the first personal mobility 1.

The storage (not shown) may also store identification information of the second personal mobility 11. The second personal mobility 11 is a personal mobility that performs group riding with the first personal mobility 1 and may be a follower.

The storage (not shown) may store hand signal information corresponding to gesture information. Here, the gesture information may be motion information of the wearable electronic device 2. The gesture information may be motion information of the body of the user wearing the wearable electronic device 2.

The storage (not shown) may be implemented by a nonvolatile memory device such as cache, read only memory (ROM), programmable ROM (PROM), erasable programmable ROM (EPROM), electrically erasable programmable ROM (EPMROM), and flash memory or a volatile memory device such as RAM or a storage medium such as HDD (Hard Disk Drive), or CD-ROM, but is not limited thereto. The storage (not shown) may be a memory implemented in a separate chip from the processor described above with respect to the controller (not shown), or may be implemented in a single chip with the processor.

The communication module 220 transmits signals having information corresponding to the control command of the processor 210 to at least one of the first personal mobility 1 or the second personal mobility 11.

The communication module 220 can also receive a signal for information transmitted from the first personal mobility 1 and transmit the received signal to the controller 110 of the first personal mobility 1.

The communication module 220 may transmit a signal having information corresponding to the control command of the controller 110 of the first personal mobility 1 to the external device, and may transmit a signal for information transmitted from the external device to the controller 110 of the first personal mobility 1. Here, the external device may include at least one of a server 320, an infrastructure 310, and a vehicle 3.

The communication module 220 may include one or more components that enable communication with the first personal mobility 1, the plurality of personal mobilities 11, and the external device, for example, at least one of a short-range communication module, a wired communication module, or a wireless communication module.

The short-range communication module may include various short-range communication modules that transmit and receive signals using a wireless communication network at a short distance such as a Bluetooth module, an infrared communication module, an RFID (Radio Frequency Identification) communication module, a WLAN (Wireless Local Access Network) communication module, an NFC communication module, and a Zigbee communication module.

The wired communication module may include various cable communication modules such as a Controller Area Network (CAN) communication module, a Local Area Network (LAN) module, a Wide Area Network (WAN) module or a Value Added Network (VAN) module, etc., as well as various wired communication modules such as a Universal Serial Bus (USB), a High Definition Multimedia Interface (HDMI), a Digital Visual Interface (DVI), a recommended standard 232 (RS-232), a power line communication, or a plain old telephone service (POTS), etc.

The wireless communication module may include a wireless communication module supporting various wireless communication methods such as a WiFi module and a Wireless broadband module, a global system for mobile communication (GSM), Code Division Multiple Access (CDMA), Wideband Code Division Multiple Access (WCDMA), a universal mobile telecommunications system (UMTS), TDMA (Time Division Multiple Access), Long Term Evolution (LTE), etc.

The wireless communication module may include a wireless communication interface including an antenna and a transmitter for transmitting signals to a personal mobility. In addition, the wireless communication module may further include a signal conversion module that modulates a digital control signal output from the controller into an analog type wireless signal through a wireless communication interface under control of the controller.

The wireless communication module may include a wireless communication interface including an antenna and a receiver to receive signals of the personal mobility. Also, the wireless communication module may further include a signal conversion module for demodulating the analog type wireless signal received through the wireless communication interface into a digital control signal.

The communication module 220 may further include a GPS receiver for obtaining the current location of the wearable electronic device 2.

Figure 4:
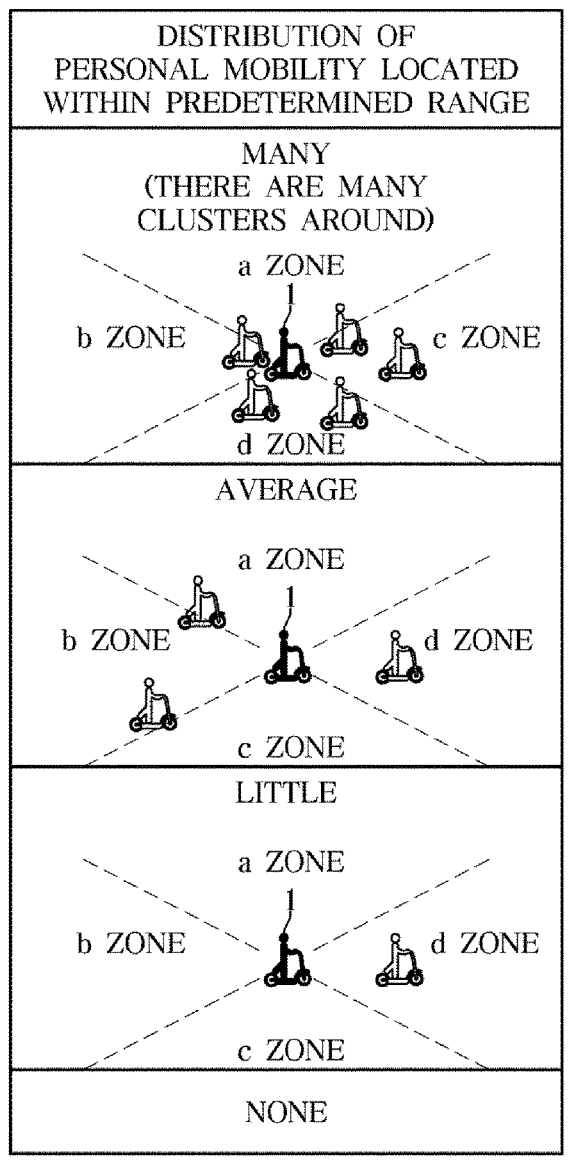
FIG. 4 is a diagram for generating hand signal information based on personal mobility and pedestrian distribution according to an embodiment of the present disclosure.
Figure 4:
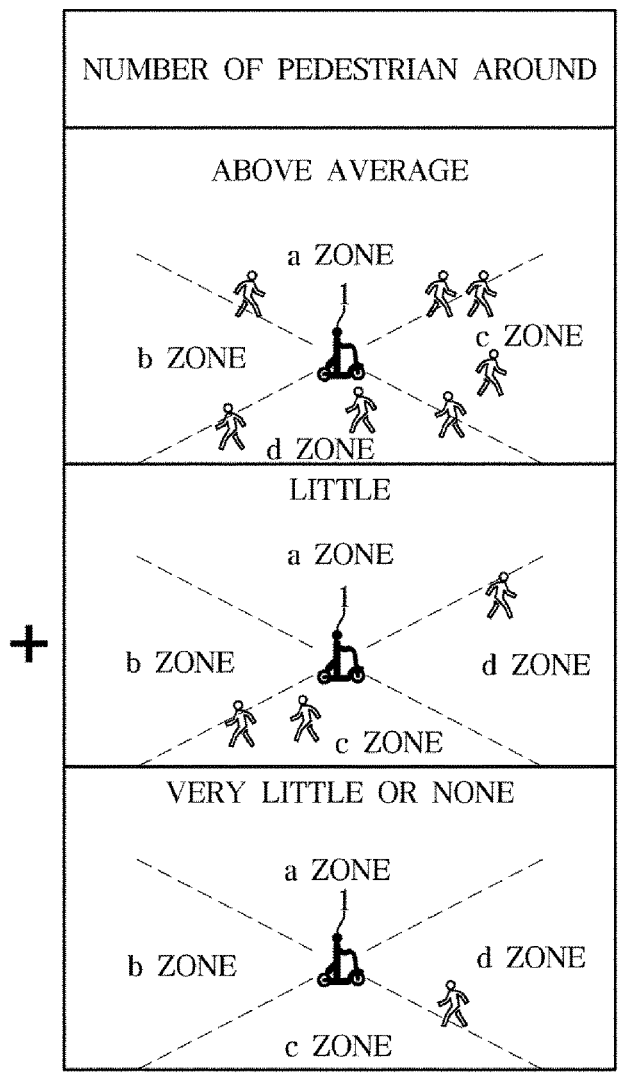
Figure 6:
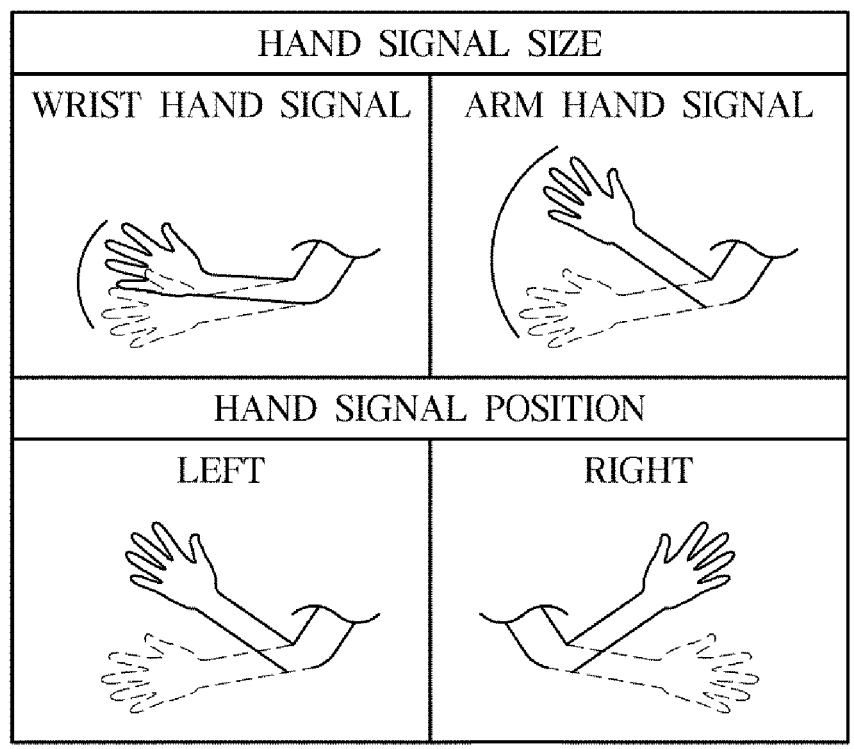
FIG. 6 is a configuration diagram of generated hand signal information of a personal mobility according to another embodiment of the present disclosure.

FIGS. 4, 5, and 6 are diagrams for generating hand signal information of a personal mobility according to an embodiment of the present disclosure.

The personal mobility 1 may generate first hand signal information by recognizing a surrounding situation.

The first hand signal information may include at least one of size information of a hand signal, left or right position information of a hand signal, transfer direction information of a hand signal, and transfer range information of a hand signal.

Hereinafter, a method of generating first hand signal information according to a distribution of a plurality of personal mobilities in located within a predetermined range will be described.

Here, the distribution of the plurality of personal mobilities in may mean the number of the plurality of personal mobilities 111 located within the predetermined range, and detailed positions of the plurality of personal mobilities 111 located within the predetermined range.

In more detail, the detailed position of personal mobilities within the predetermined range may be a distance between the plurality of personal mobilities 111 and the personal mobility 1.

The predetermined range may mean a range within a certain distance in all directions of the front, rear, left, and right centering on the personal mobility 1, and the direction and distance may be set according to the user's selection.

For example, as shown in FIG. 4, the personal mobility 1 may recognize five personal mobilities of the plurality of personal mobilities in around the personal mobility 1.

If it is recognized that the number of a plurality of personal mobilities in located within a predetermined range is five, detailed positions of the plurality of personal mobilities 111 may be determined. Each distance between the personal mobility 1 and the determined plurality of personal mobilities 111 may be detected.

If it is determined that the distance is narrower than a certain distance, the size information of the first hand signal may be determined as a small hand signal. For example, as shown in FIG. 6, the small hand signal may be the transmission of the hand signal using the user's hand.

When it is determined that the detailed positions of the determined plurality of personal mobilities 11 are clustered in d zone based on the personal mobility 1, the personal mobility 1 may determine the position of the hand signal to the right. For example, when the hand signal position is to the right, the hand signal may be transmitted using the user's right wrist or right arm, as shown in FIG. 6.

The personal mobility 1 selects any one of a plurality of personal mobilities 111 for transmitting the first hand signal and may determine transfer range information of the first hand signal based on the detailed position of the selected personal mobility 11. In more detail, as shown in FIG. 5, the hand signal transfer range of the first hand signal information may be a personal mobility within a predetermined distance based on the personal mobility 1.

A hand shape corresponding to personal mobility within the predetermined distance may be set. For example, in order to transmit a hand signal to a personal mobility within a 7 m distance based on the personal mobility 1, the set hand shape may be the use of two fingers, but is not limited thereto.

For example, in order to transmit a hand signal to a personal mobility or pedestrian in front of the personal mobility 1, the set hand shape may be such that the palm is visible, but is not limited thereto.

For example, as shown in FIG. 4, the personal mobility 1 may recognize three personal mobilities of the plurality of personal mobilities 111 around the personal mobility 1.

If it is recognized that the number of a plurality of personal mobilities in located within a predetermined range is three, detailed positions of the plurality of personal mobilities in may be determined. Each distance between the personal mobility 1 and the determined plurality of personal mobilities 111 may be detected.

If it is determined that the distance is wider than a certain distance, the size information of the first hand signal may be determined as a large hand signal. For example, as shown in FIG. 6, the large hand signal may be the transmission of the hand signal using the user's arm.

When it is determined that the detailed positions of the determined plurality of personal mobilities in are clustered in b zone based on the personal mobility 1, the personal mobility 1 may determine the transfer direction of the first hand signal as a rear b zone.

For example, as shown in FIG. 4, the personal mobility 1 may recognize a plurality of personal mobilities in centered on the personal mobility 1.

If it is recognized that the number of personal mobilities in located within a predetermined range is one, a detailed position of the personal mobility 11 may be determined. The distance between the personal mobility 1 and the determined personal mobility 11 may be detected.

If it is determined that the distance is wider than a certain distance, the size information of the first hand signal may be determined as a large hand signal. For example, as shown in FIG. 6, the large hand signal may be the transmission of the hand signal using the user's arm.

When it is determined that the detailed positions of the determined plurality of personal mobilities 11 are clustered in d zone based on the personal mobility 1, the personal mobility 1 may determine the transfer direction of the first hand signal as a forward d zone.

Hereinafter, a method of generating first hand signal information according to a distribution of a plurality of pedestrians located within a predetermined range will be described.

Here, the distribution of the plurality of pedestrians may mean the number of the plurality of pedestrians located within the predetermined range, and detailed positions of the plurality of pedestrians located within the predetermined range.

In more detail, the detailed position of the plurality of pedestrians within the predetermined range may be a distance between the plurality of pedestrians and the personal mobility 1.

The predetermined range may mean a range within a certain distance in all directions of the front, rear, left, and right centering on the personal mobility 1, and the direction and distance may be set according to the user's selection.

For example, as shown in FIG. 4, the personal mobility 1 may recognize seven pedestrians around the personal mobility 1.

If it is recognized that the number of a plurality of pedestrians located within a predetermined range is seven, detailed positions of the plurality of pedestrians may be determined. Each distance between the personal mobility 1 and the determined plurality of pedestrians may be detected.

If it is determined that the distance is wider than a certain distance, the size information of the first hand signal may be determined as a large hand signal. For example, as shown in FIG. 6, the large hand signal may be the transmission of the hand signal using the user's arm.

When it is determined that the detailed positions of the determined plurality of pedestrians are clustered in c zone based on the personal mobility 1, the personal mobility 1 may determine the transfer direction of the first hand signal as a forward c zone.

For example, as shown in FIG. 4, the personal mobility 1 may recognize three pedestrians around the personal mobility 1.

If it is recognized that the number of a plurality of pedestrians located within a predetermined range is three, detailed positions of the plurality of pedestrians may be determined. Each distance between the personal mobility 1 and the determined plurality of pedestrians may be detected.

If it is determined that the distance is larger than a certain distance, the size information of the first hand signal may be determined as a large hand signal. For example, as shown in FIG. 6, the large hand signal may be the transmission of the hand signal using the user's arm.

When it is determined that the detailed positions of the determined plurality of pedestrians are clustered in d zone based on the personal mobility 1, the personal mobility 1 may determine the position of the hand signal to the right. For example, when the hand signal position is to the right, the hand signal may be transmitted using the user's right wrist or right arm, as shown in FIG. 6.

For example, as shown in FIG. 4, the personal mobility 1 may recognize one pedestrian around the personal mobility 1.

If it is recognized that the number of pedestrians located within a predetermined range is one, a detailed position of the pedestrian may be determined. A distance between the personal mobility 1 and the determined pedestrian may be detected.

If it is determined that the distance is wider than a certain distance, the size information of the first hand signal may be determined as a large hand signal. For example, as shown in FIG. 6, the large hand signal may be the transmission of the hand signal using the user's arm.

Based on the personal mobility 1, when it is determined that the detailed positions of the determined plurality of pedestrians are located between the d zone and the c zone, the personal mobility 1 may determine the transfer direction of the first hand signal as a forward d zone and a right c zone.

Figure 7A:
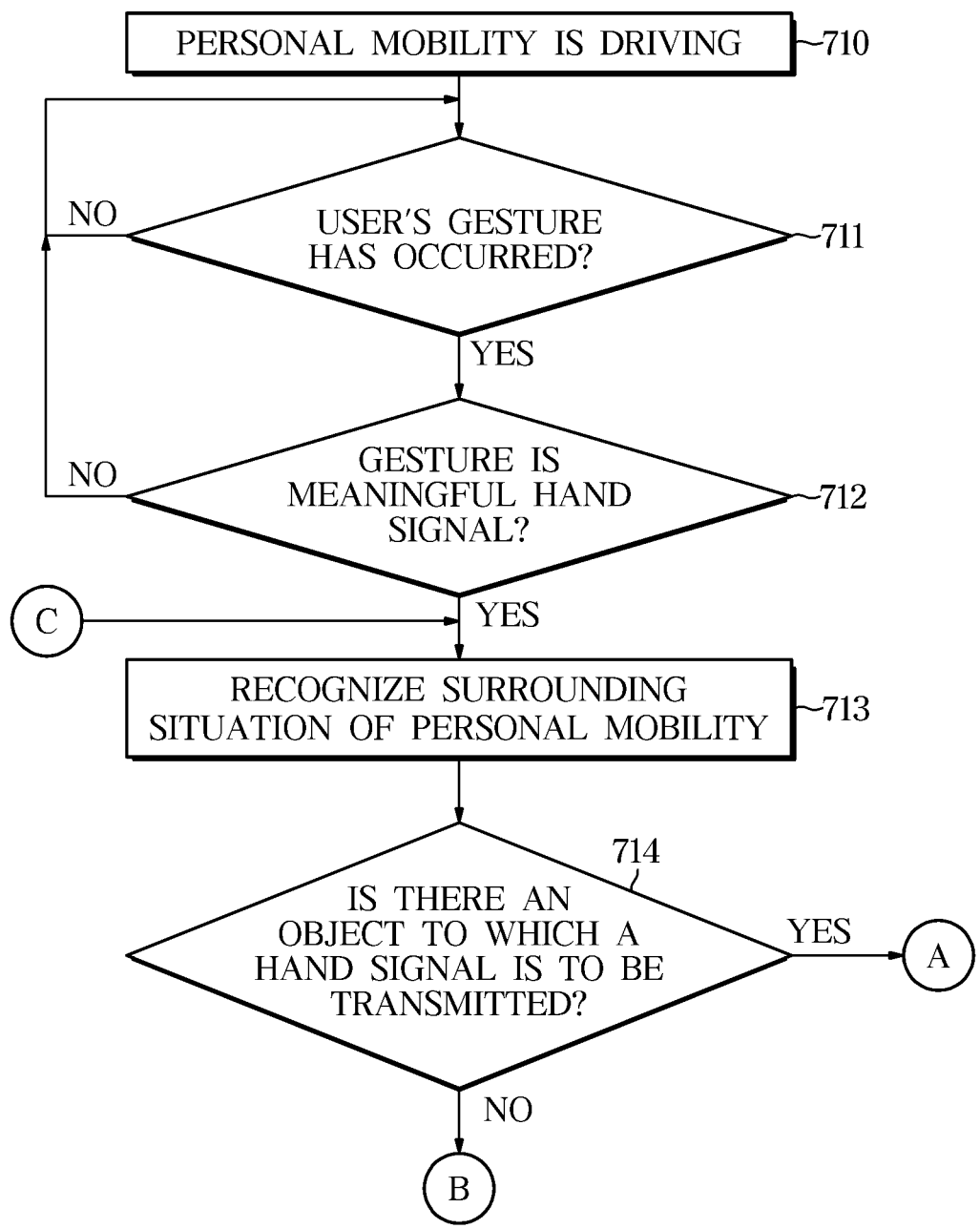
FIGS. 7A and 7B are flowcharts of a control method of a personal mobility according to an embodiment of the present disclosure.
Figure 7B:
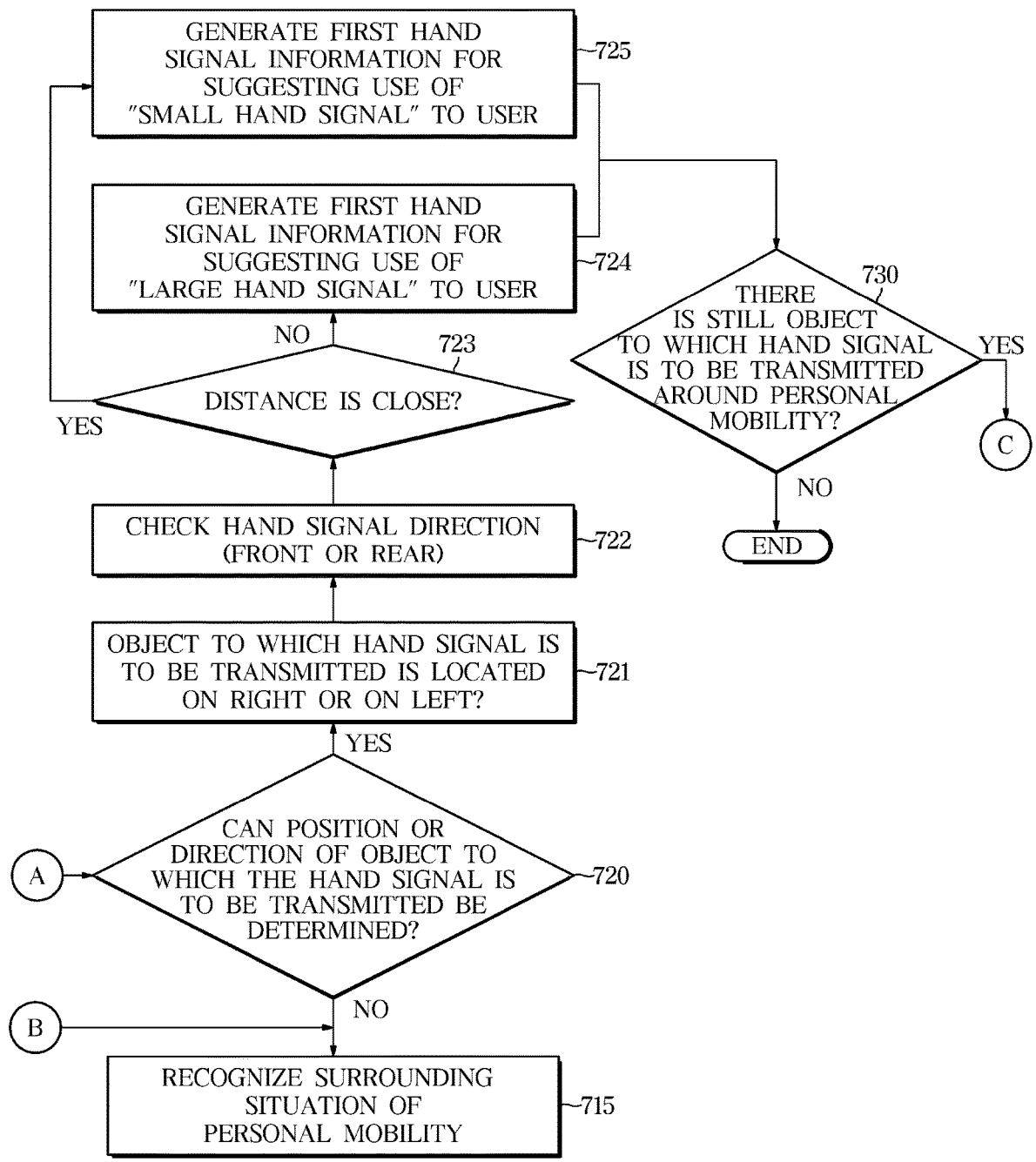

FIGS. 7A and 7B are flowcharts of a control method of a personal mobility according to an embodiment of the present disclosure.

The method starts in a state where the personal mobility 1 is driving (710). This state can be determined by the personal mobility 1.

When the personal mobility 1 is driving, the personal mobility 1 may determine whether the user's gesture has occurred (711).

In more detail, the user's gesture may be a user's gesture detected by a wearable electronic device 2 connected to the personal mobility 1 through wireless communication. When the user's gesture is detected by the wearable electronic device 2, the wearable electronic device 2 may transmit information corresponding to the gesture to the personal mobility 1. The personal mobility 1 may determine whether the user's gesture has occurred by receiving information corresponding to the gesture.

If it is determined that the user's gesture has occurred (yes at 711), the personal mobility 1 may determine whether the gesture is a meaningful hand signal (712).

In more detail, in determining whether the gesture is a meaningful hand signal, the personal mobility 1 may determine whether the gesture matches a predetermined gesture, and when the gesture matches, it may be determined as a meaningful gesture.

If it is determined that the user's gesture is meaningful (yes at 712), the personal mobility 1 may recognize a surrounding situation of the personal mobility 1 (713).

The recognizing the surrounding situation may be to recognize at least one of the number of personal mobilities located within a predetermined range of the personal mobility 1, the detailed position of the personal mobilities located within the predetermined range, the number of pedestrians located within the predetermined range, and the detailed positions of the pedestrians located within the predetermined range.

In the predetermined range, a direction and a distance may be set according to a user's selection of the personal mobility 1.

Recognizing the surrounding situation may be recognized based on image information obtained through a camera. In addition, it may be recognized based on location information of personal mobilities located within a predetermined range and location information of pedestrians located within a predetermined range obtained through an Intelligent Transportation System (ITS).

A device of the ITS may be mounted on a personal mobility located within a predetermined range, detect a position value of the personal mobility located within the predetermined range, and transmit the detected position value to the personal mobility 1.

In addition, the device of the ITS may be mounted on a wearable electronic device of a pedestrian located within a predetermined range, detect a position value of the pedestrian located within the predetermined range, and transmit the detected position value of the pedestrian to the personal mobility 1.

The personal mobility 1 may determine whether there is an object, e.g., the personal mobility, pedestrian, or vehicle, to which at least one hand signal is to be transmitted based on the surrounding situation (714).

If there is no object to which the hand signal is to be transmitted among the personal mobility, the pedestrian, and the vehicle (no at 714), the personal mobility 1 may repeatedly recognize the surrounding situation of the personal mobility 1 (715).

If it is determined that there is an object to which the hand signal is to be transmitted (yes at 714), the personal mobility 1 can check whether the position or direction of the object to which the hand signal is to be transmitted can be determined (720).

If the location or direction of the object to which the hand signal is to be transmitted cannot be determined (no at 720), it is determined that the location of the object to which the hand signal is to be transmitted is not correct, so that the surrounding situation of the personal mobility 1 can be repeatedly recognized (715).

If the location or direction of the object to which the hand signal is to be transmitted can be determined (yes at 720), the personal mobility 1 may determine a detailed position of the object to which the hand signal is to be transmitted.

The personal mobility 1 may check whether the object to which the hand signal is to be transmitted is located on the right or on the left (721).

The personal mobility 1 may generate left or right position information of the hand signal based on the position of the object to which the hand signal is to be transmitted. For example, when the location information of the hand signal is left, the user may generate information for suggesting use of the 'left wrist or left arm'.

The personal mobility 1 may check whether the object to which the hand signal is to be transmitted is located in the front or the rear (722).

The personal mobility 1 may generate transfer direction information of a hand signal based on a location of an object to which the hand signal is to be transmitted.

The personal mobility 1 may determine whether a distance between an object to which the hand signal is to be transmitted and the personal mobility 1 is close (723).

If the distance between the object to which the hand signal is to be transmitted and the personal mobility 1 is not close (no to 723), the personal mobility 1 may generate first hand signal information including size information of a hand signal for suggesting use of a "large hand signal" to a user (724).

If the distance between the object to which the hand signal is to be transmitted and the personal mobility 1 is close (yes to 723), the personal mobility 1 may generate first hand signal information including size information of a hand signal for suggesting use of a "small hand signal" to a user (725).

For example, a small hand signal may transmit a hand signal using the user's wrist, and a large hand signal may transmit a hand signal using the user's arm.

The personal mobility 1 may generate the first hand signal information by including at least one of size information of the hand signal, left or right position information of the hand signal, transfer direction information of the hand signal, and transfer range information of the hand signal based on the location of the object to which the hand signal is to be transmitted.

A user who has boarded the personal mobility 1 may perform a first hand signal corresponding to the first hand signal information.

The personal mobility 1 may determine whether there are more objects to which the hand signal is to be transmitted around the personal mobility 1 (730).

If there is another object to which the hand signal is to be transmitted around the personal mobility 1 (yes to 730), the personal mobility 1 can return to step 713 to continuously recognize the surrounding situation of the personal mobility 1. If there is not another object to which the hand signal is to be transmitted around the personal mobility (no to 730), the personal mobility 1 can go END.

Figure 8:
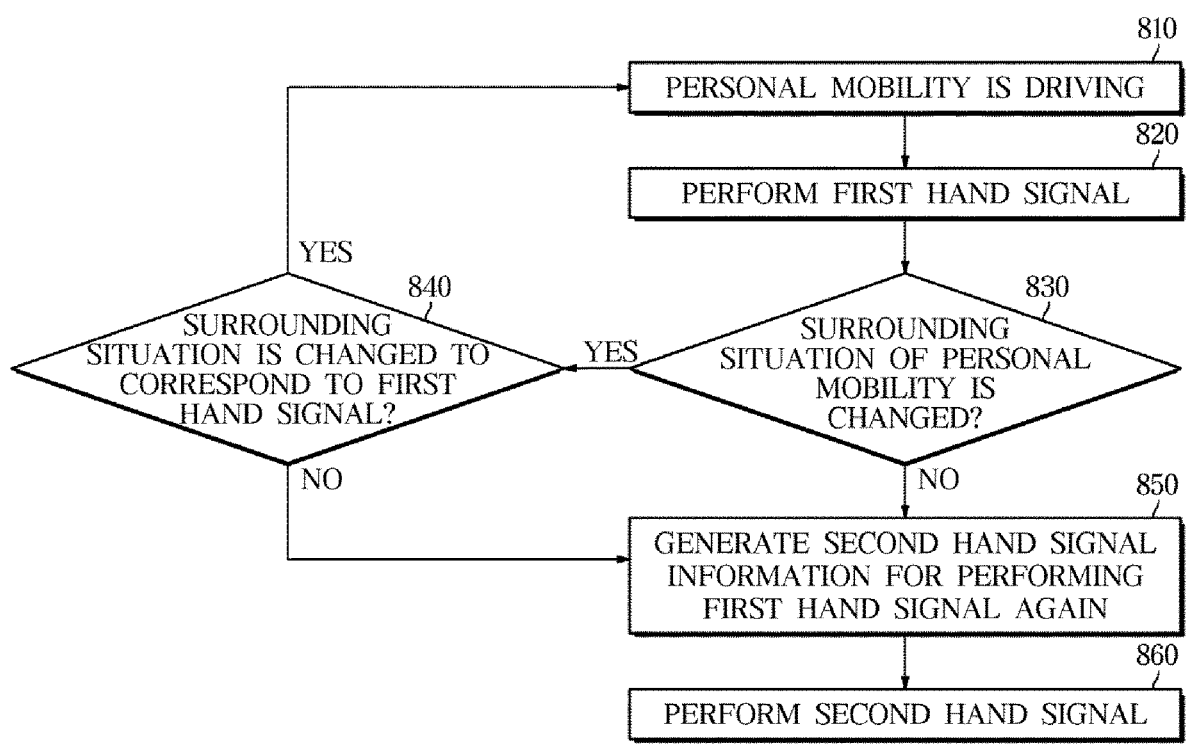
FIG. 8 is a flowchart of a control method of a personal mobility according to another embodiment of the present disclosure.

FIG. 8 is a flowchart of a control method of a personal mobility according to another embodiment of the present disclosure.

The method starts in a state where the personal mobility 1 is driving (810). This state can be determined by the personal mobility 1.

The personal mobility 1 may determine a user who has boarded the personal mobility 1 has performed a hand signal corresponding to the first hand signal information (820).

The personal mobility 1 may recognize a change in a surrounding situation within a predetermined range based on the personal mobility 1 (830). The personal mobility 1 may detect a speed value of whether a speed of a personal mobility located within the predetermined range has changed. In addition, the personal mobility 1 may detect a GPS value of whether a GPS of the personal mobility located within the predetermined range has changed.

If there is a change in the detected speed value and the GPS value, the personal mobility 1 may determine that the surrounding situation of the personal mobility 1 has changed (yes at 830).

When the surrounding situation of the personal mobility 1 is changed (yes at 830), the personal mobility 1 can check whether the surrounding environment has changed to correspond to the first hand signal (840).

If the surrounding situation of the personal mobility 1 is not changed (no at 830) or if the surrounding environment has not changed to correspond to the first hand signal (no at 840), the personal mobility 1 may generate second hand signal information for performing the first hand signal again (850).

The second hand signal may include the first hand signal information, and the second hand signal information may include feedback information for proposing to perform the first hand signal again.

A user who has boarded the personal mobility 1 may perform a second hand signal corresponding to the second hand signal information (860).

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

According to an embodiment of the present disclosure, a personal mobility includes a system that recognizes surrounding conditions and provides hand signals, and has an effect that a user can more conveniently drive the personal mobility.

What is claimed is:

1. A personal mobility comprising:
a user interface;
a transceiver; and
a controller configured to obtain a first surrounding situation from a camera or an intelligence transportation system based a user's gesture information received from a wearable electronic device through the transceiver, to generate first hand signal information based on the first surrounding situation, control the user interface to output the first hand signal information, to obtain a second surrounding situation from the camera or intelligence transportation system after the first hand signal information is output, and to generate second hand signal information based on the second surrounding situation.

2. The personal mobility according to claim 1, wherein the controller is configured to control the user interface to output the second hand signal information.

3. The personal mobility according to claim 1, wherein the controller is configured to obtain the second surrounding situation when the received user gesture information is predetermined gesture information.

4. The personal mobility according to claim 1, wherein the second hand signal information comprises feedback information.

5. The personal mobility according to claim 4, wherein the feedback information indicates whether the user performed a first hand signal corresponding to the first hand signal information.

6. The personal mobility according to claim 1 wherein the user interface comprises at least one of a speaker or a display.

7. The personal mobility according to claim 1, wherein the controller is configured to obtain information from the camera and to communicate with additional personal mobilities through the intelligent transportation system.

8. The personal mobility according to claim 1, wherein the first hand signal information is configured to be generated based on at least one of a number of additional personal mobilities located within a predetermined range of the personal mobility, detailed positions of the additional personal mobilities located within the predetermined range, a number of pedestrians located within the predetermined range, or detailed positions of the number of pedestrians located within the predetermined range.

9. The personal mobility according to claim 1, wherein the first hand signal information comprises at least one of size information of a hand signal, left or right position information of the hand signal, transfer direction information of the hand signal, or transfer range information of the hand signal.

10. The personal mobility according to claim 1, wherein the controller is configured to determine whether the second surrounding situation changes from the first surrounding situation based on at least one of a speed change value of an additional personal mobility located within a predetermined range or a GPS change value of the additional personal mobility within the predetermined range.

11. A control method of a personal mobility, the method comprising:
receiving a user's gesture information from a wearable device;
obtaining a first surrounding situation based on the user's gesture information;
generating first hand signal information based on the first surrounding situation;
outputting the first hand signal information through a user interface that comprises least one of a display or a speaker;
obtaining a second surrounding situation after the first hand signal information is output; and
generating second hand signal information based on the second surrounding situation.

12. The method according to claim 11, further comprising outputting the second hand signal information through the user interface.

13. The method according to claim 11, wherein obtaining the first surrounding situation comparing the received user's gesture information and predetermined gesture information the first surrounding situation being obtained when the received user gesture information matches the predetermined gesture information.

14. The method according to claim 11, wherein the second hand signal information comprises feedback information.

15. The method according to claim 14, wherein the feedback information indicates whether the user performed a first hand signal corresponding to the first hand signal information.

16. The method according to claim 11, further comprising:
using a camera to recognize at least one of the first surrounding situation or the second surrounding situation; and
communicating with at least one of a number of additional personal mobilities through an intelligent transportation system.

17. The method according to claim 11, wherein the first hand signal information is generated based on at least one of a number of additional personal mobilities located within a predetermined range of the personal mobility, detailed positions of the additional personal mobilities located within the predetermined range, a number of pedestrians located within the predetermined range, or detailed positions of the pedestrians located within the predetermined range.

18. The method according to claim 11, wherein the first hand signal information comprises at least one of size information of a hand signal, left or right position information of the hand signal, transfer direction information of the hand signal, and transfer range information of the hand signal.

19. The method according to claim 11, further comprising:
   determining whether the second surrounding situation changes from the first surrounding situation based on at least one of a speed change value of an additional personal mobility located within a predetermined range or a GPS change value of the additional personal mobility within the predetermined range.

20. A wearable electronic device comprising:
   a user interface;
   a sensor configured to detect a user's gesture;
   a transceiver; and
   a processor configured to transmit information corresponding to the user's gesture to a first personal mobility of a plurality of personal mobilities when the user's gesture is detected, receive first hand signal information from the first personal mobility via the transceiver, and control the user interface to output the first hand signal information.

21. The wearable electronic device according to claim 20, wherein the processor is configured to receive second hand signal information comprising feedback information from the first personal mobility.

22. The wearable electronic device according to claim 21, wherein the processor is configured to control the user interface to output the received second hand signal information.

23. The wearable electronic device according to claim 20, wherein the processor is configured to detect a position value of each of the plurality of personal mobilities and transmit the position value to the first personal mobility via the transceiver.

24. The wearable electronic device according to claim 20, wherein the processor is configured to recognize a second surrounding situation information after the first hand signal information is output and to transmit the second surrounding situation information to the first personal mobility.

* * * * *